(12) United States Patent
Cleeton et al.

(10) Patent No.: US 8,612,633 B2
(45) Date of Patent: Dec. 17, 2013

(54) VIRTUAL MACHINE FAST EMULATION ASSIST

(75) Inventors: Lawrence R. Cleeton, Sammamish, WA (US); Andrei Warkentin, Sammamish, WA (US); Andrew Nicholas, Bellevue, WA (US); Rene Antonio Vega, Kirkland, WA (US); Jacob Oshins, Seattle, WA (US); John A. Starks, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 89 days.

(21) Appl. No.: 12/752,014

(22) Filed: Mar. 31, 2010

(65) Prior Publication Data

US 2011/0246171 A1   Oct. 6, 2011

(51) Int. Cl.
*G06F 3/00* (2006.01)
*G06F 9/455* (2006.01)

(52) U.S. Cl.
USPC ............ 710/5; 703/24; 703/25; 718/1

(58) Field of Classification Search
USPC ............................................. 710/5
See application file for complete search history.

(56) References Cited

U.S. PATENT DOCUMENTS

| | | | |
|---|---|---|---|
| 7,111,145 B1 | 9/2006 | Chen et al. | |
| 7,552,436 B2* | 6/2009 | Brice et al. | 718/104 |
| 7,580,826 B2 | 8/2009 | Vega et al. | |
| 7,865,893 B1* | 1/2011 | Omelyanchuk et al. | 718/1 |
| 7,904,903 B2* | 3/2011 | Grobman et al. | 718/1 |
| 8,024,506 B1* | 9/2011 | Agesen et al. | 711/6 |
| 2005/0027871 A1* | 2/2005 | Bradley et al. | 709/227 |
| 2007/0106986 A1 | 5/2007 | Worley | |
| 2008/0005297 A1* | 1/2008 | Kjos et al. | 709/223 |
| 2008/0148048 A1 | 6/2008 | Govil et al. | |
| 2009/0113425 A1 | 4/2009 | Ports et al. | |
| 2009/0157926 A1* | 6/2009 | Hashimoto | 710/105 |
| 2009/0164990 A1* | 6/2009 | Ben-Yehuda et al. | 718/1 |
| 2009/0187726 A1 | 7/2009 | Serebrin et al. | |
| 2009/0300613 A1* | 12/2009 | Doi | 718/1 |
| 2010/0122008 A1* | 5/2010 | Goss et al. | 710/264 |
| 2010/0162243 A1* | 6/2010 | Barde et al. | 718/100 |

OTHER PUBLICATIONS

Ferrie, P., "Attacks on Virtual Machine Emulators," Dec. 5, 2006, 13 pgs, downloaded Jan. 7, 2010, http://www.symantec.com/avcenter/reference/Virtual_Machine_Threats.pdf.

LeVasseur et al., "Pre-Virtualization: Slashing the Cost of Virtualization," Nov. 2005, 14 pgs, downloaded Jan. 7, 2010, http://l4ka.org/publications/2005/previrtualization-techreport.pdf.

* cited by examiner

*Primary Examiner* — Idriss N Alrobaye
*Assistant Examiner* — Ronald Modo
(74) *Attorney, Agent, or Firm* — Woodcock Washburn, LLP

(57) ABSTRACT

Techniques for reducing virtual machine input/output emulation overhead and decreasing the attack surface of a virtual machine architecture are disclosed.

20 Claims, 10 Drawing Sheets

VIRTUAL MACHINE FAST EMULATION ASSIST

BACKGROUND

Virtual machine architecture has evolved over the years to include different input/output (IO) paths to the IO hardware of the physical computer system. For example, a hypervisor can include an emulated IO path. An IO controller emulator, e.g., a software model of a hardware device, one which responds enough like the hardware device that the device driver for the driver functions normally, can execute in a hypervisor and a driver for the IO controller can run in a virtual machine. In this architecture the IO controller emulator runs from a centralized location and is used to service all virtual machines. This architecture was chosen because it reduces the memory footprint of each virtual machine and provides a way to update one emulator and update all emulators in the system.

An emulator in the hypervisor can be run when a driver touches resources, e.g., memory mapped to the controller or ports of the controller and the hypervisor can trap the request. The hypervisor can suspend a virtual processor running the driver and pass control to the IO controller emulator along with the value written by the driver. The IO emulator can execute and determine what operation the driver issued and perform the operation on behalf of the driver.

This architecture, however, is computationally expensive because it requires a context switch for each byte written an IO register or to memory mapped IO space, and it may require hundreds of writes to hundreds of registers before an IO request is completed. In addition to being computationally expensive, since the emulator executes within the hypervisor, it presents a large attack surface that could be potentially exploited in order to gain control of the physical computer system. For example, emulators are emulating complex hardware state machines and for a software developer it is relatively difficult to ensure that each emulator works for every possible combination of states that the emulator could be put in. A user could potentially generate a stream of illegal operations that cause the hypervisor to, for example, allow a user to access memory outside of the virtual machine or crash the hypervisor.

Virtualized systems also include another IO path that is easier to analyze from a security point of view and requires fewer processor cycles to run because it does not emulate IO devices. In this path a paravirtualization driver, e.g., a driver that was specifically designed to operate in a virtualized environment, can use high level communication protocols such as SCSI to send IO requests to a virtualization service provider that can parse the protocol and execute the IO job on its behalf. This path is more secure because it presents a smaller attack surface and security protocols can be used to determine what traffic is sent. This path is not always available though. For example, this path could be unavailable because a paravirtualization driver has not been created for the IO device or a user has not installed it. This path also typically relies on services offered by the guest operating system and may not be available during boot. Thus, the emulation path can not be simply eliminated because there are instances where it may be required.

Accordingly, virtual machine architecture has evolved to the point where there are two paths for doing the same thing. One is computationally expensive and presents a large attack surface; the other is computationally much cheaper and presents a smaller attack surface. Since the emulation path can not be simply eliminated, techniques for making it less computationally expensive, more secure, and more similar to the paravirtualization path are desirable.

SUMMARY

An example embodiment of the present disclosure describes a method. In this example, the method includes, but is not limited to configuring an input/output controller emulator to execute in a virtual machine; and configuring an IO message passing channel to send input/output requests generated by the input/output controller emulator to a virtualization service provider. In addition to the foregoing, other aspects are described in the claims, drawings, and text forming a part of the present disclosure.

An example embodiment of the present disclosure describes a method. In this example, the method includes, but is not limited to performing a context switch to execute an input/output controller emulator in response to determining that a register mapped to an input/output controller emulator was accessed, wherein the input/output controller emulator is configured to execute within a virtual machine; and sending an input/output request generated by the input/output controller emulator to a virtualization service provider via an IO message passing channel. In addition to the foregoing, other aspects are described in the claims, drawings, and text forming a part of the present disclosure.

An example embodiment of the present disclosure describes a method. In this example, the method includes, but is not limited to executing, by a virtual processor, a guest operating system, wherein the guest operating system is configured to execute within a virtual machine; receiving, via an IO message passing channel, a signal related to an input/output job from a virtualization service provider; loading a page table that maps virtual addresses to virtual guest physical addresses; and executing an input/output controller emulator in the virtual machine. In addition to the foregoing, other aspects are described in the claims, drawings, and text forming a part of the present disclosure.

It can be appreciated by one of skill in the art that one or more various aspects of the disclosure may include but are not limited to circuitry and/or programming for effecting the herein-referenced aspects of the present disclosure; the circuitry and/or programming can be virtually any combination of hardware, software, and/or firmware configured to effect the herein-referenced aspects depending upon the design choices of the system designer.

The foregoing is a summary and thus contains, by necessity, simplifications, generalizations and omissions of detail. Those skilled in the art will appreciate that the summary is illustrative only and is not intended to be in any way limiting.

DETAILED DESCRIPTION

Figure 1:
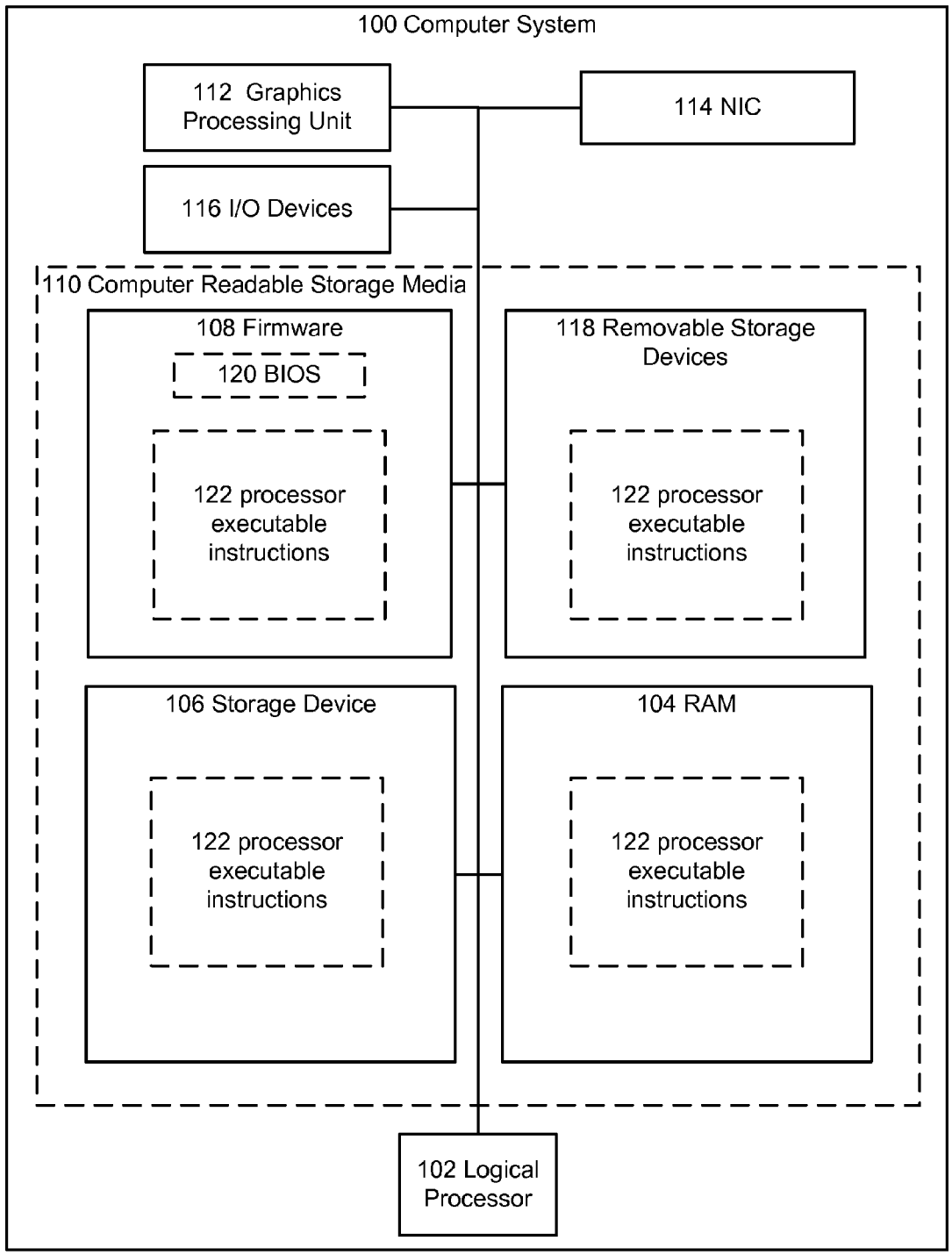
FIG. 1 depicts an example computer system wherein aspects of the present disclosure can be implemented.

Embodiments may execute on one or more computer systems. FIG. 1 and the following discussion are intended to provide a brief general description of a suitable computing environment in which the disclosure may be implemented.

The term circuitry used throughout the disclosure can include hardware components such as hardware interrupt controllers, hard drives, network adaptors, graphics processors, hardware based video/audio codecs, and the firmware used to operate such hardware. The term circuitry can also include microprocessors, application specific integrated circuits, and/or one or more logical processors, e.g., one or more cores of a multi-core general processing unit configured by firmware and/or software. Logical processor(s) can be configured by instructions embodying logic operable to perform function(s) that are loaded from memory, e.g., RAM, ROM, firmware, and/or mass storage. In an example embodiment where circuitry includes a combination of hardware and software an implementer may write source code embodying logic that is subsequently compiled into machine readable code that can be executed by a logical processor. Since one skilled in the art can appreciate that the state of the art has evolved to a point where there is little difference between hardware implemented functions or software implemented functions, the selection of hardware versus software to effectuate herein described functions is merely a design choice. Put another way, since one of skill in the art can appreciate that a software process can be transformed into an equivalent hardware structure, and a hardware structure can itself be transformed into an equivalent software process, the selection of a hardware implementation versus a software implementation is left to an implementer.

Referring now to FIG. 1, an exemplary computing system 100 is depicted. Computer system 100 can include a logical processor 102, e.g., an execution core. While one logical processor 102 is illustrated, in other embodiments computer system 100 may have multiple logical processors, e.g., multiple execution cores per processor substrate and/or multiple processor substrates that could each have multiple execution cores. As shown by the figure, various computer readable storage media 110 can be interconnected by one or more system busses which couples various system components to the logical processor 102. The system buses may be any of several types of bus structures including a memory bus or memory controller, a peripheral bus, and a local bus using any of a variety of bus architectures. In example embodiments the computer readable storage media 110 can include for example, random access memory (RAM) 104, storage device 106, e.g., electromechanical hard drive, solid state hard drive, etc., firmware 108, e.g., FLASH RAM or ROM, and removable storage devices 118 such as, for example, CD-ROMs, floppy disks, DVDs, FLASH drives, external storage devices, etc. It should be appreciated by those skilled in the art that other types of computer readable storage media can be used such as magnetic cassettes, flash memory cards, digital video disks, and Bernoulli cartridges.

The computer readable storage media 110 can provide non volatile and volatile storage of processor executable instructions 122, data structures, program modules and other data for the computer 100 such executable instructions that effectuate manager 250 described in the following figures. A basic input/output system (BIOS) 120, containing the basic routines that help to transfer information between elements within the computer system 100, such as during start up, can be stored in firmware 108. A number of programs may be stored on firmware 108, storage device 106, RAM 104, and/or removable storage devices 118, and executed by logical processor 102 including an operating system and/or application programs.

Commands and information may be received by computer 100 through input devices 116 which can include, but are not limited to, a keyboard and pointing device. Other input devices may include a microphone, joystick, game pad, scanner or the like. These and other input devices are often connected to the logical processor 102 through a serial port interface that is coupled to the system bus, but may be connected by other interfaces, such as a parallel port, game port or universal serial bus (USB). A display or other type of display device can also be connected to the system bus via an interface, such as a video adapter which can be part of, or connected to, a graphics processor 112. In addition to the display, computers typically include other peripheral output devices (not shown), such as speakers and printers. The exemplary system of FIG. 1 can also include a host adapter, Small Computer System Interface (SCSI) bus, and an external storage device connected to the SCSI bus.

Computer system 100 may operate in a networked environment using logical connections to one or more remote computers, such as a remote computer. The remote computer may be another computer, a server, a router, a network PC, a peer device or other common network node, and typically can include many or all of the elements described above relative to computer system 100.

When used in a LAN or WAN networking environment, computer system 100 can be connected to the LAN or WAN through a network interface card 114. The NIC 114, which may be internal or external, can be connected to the system bus. In a networked environment, program modules depicted relative to the computer system 100, or portions thereof, may be stored in the remote memory storage device. It will be appreciated that the network connections described here are exemplary and other means of establishing a communications link between the computers may be used. Moreover, while it is envisioned that numerous embodiments of the present disclosure are particularly well-suited for computerized systems, nothing in this document is intended to limit the disclosure to such embodiments.

Figure 2:
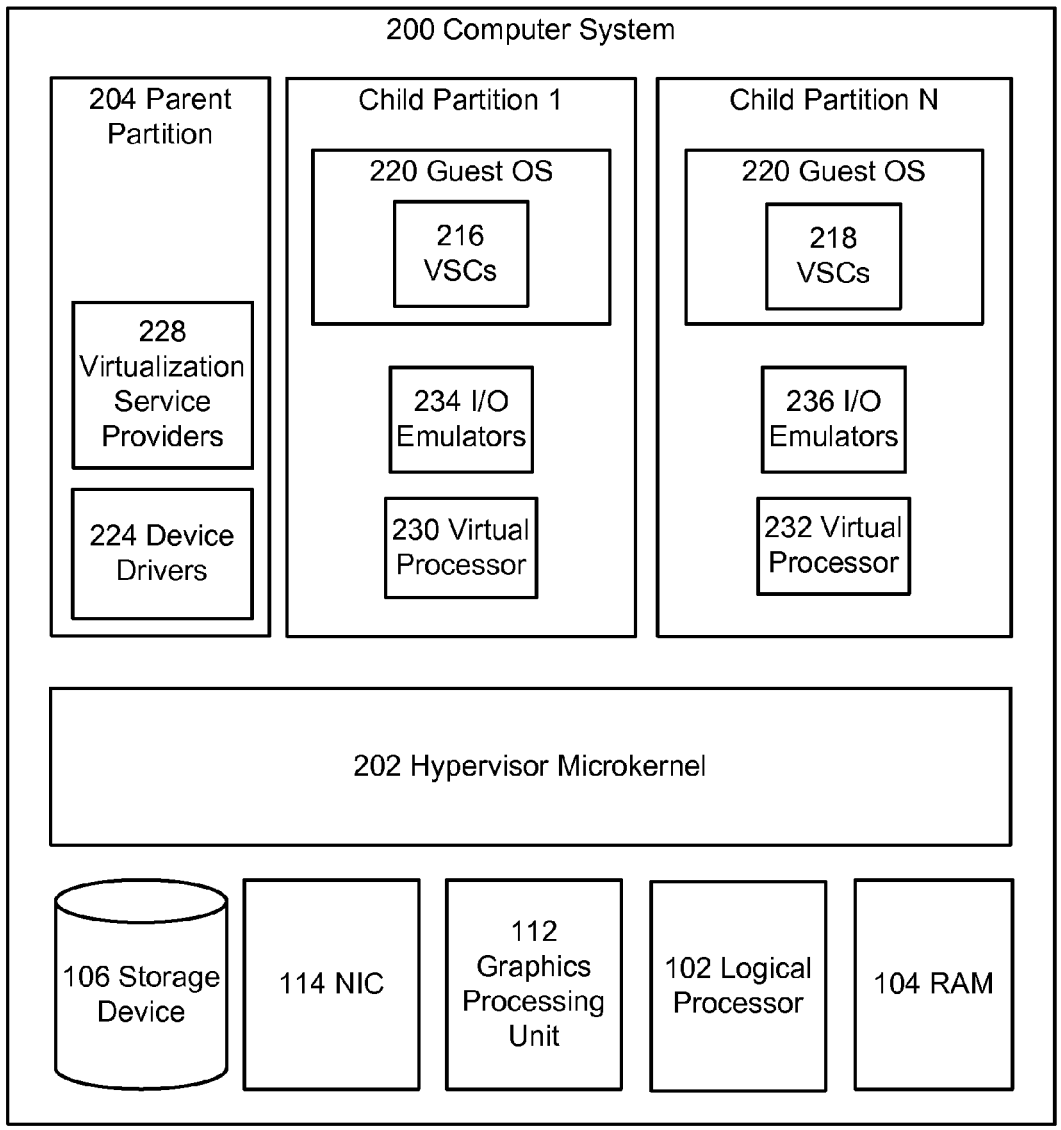
FIG. 2 depicts an operational environment for practicing aspects of the present disclosure.
Figure 3:
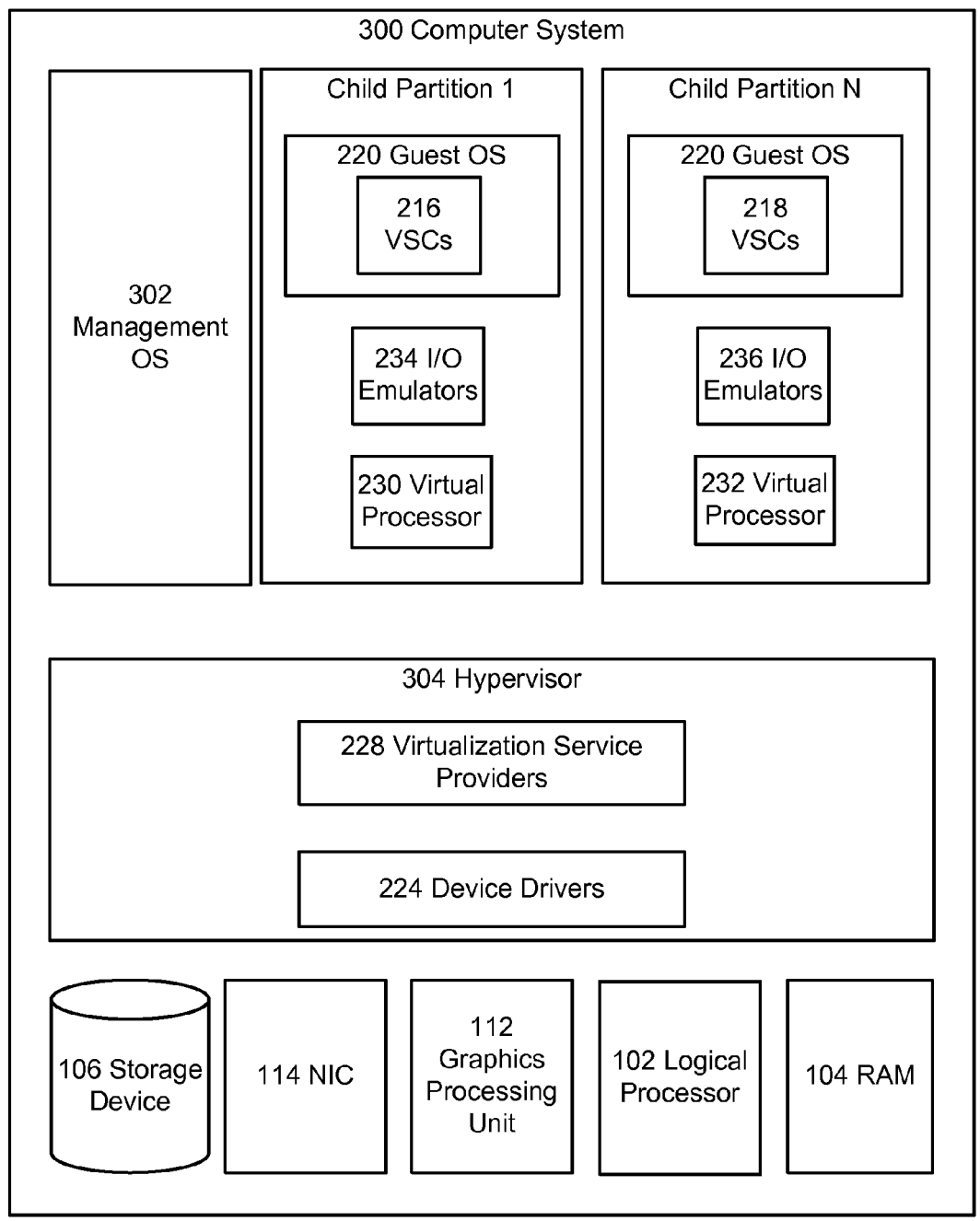
FIG. 3 depicts an operational environment for practicing aspects of the present disclosure.

Referring now to FIGS. 2 and 3, they depict high level block diagrams of computer systems 200 and 300 configured to effectuate virtual machines. In example embodiments of the present disclosure computer systems 200 and 300 can include elements described in FIG. 1 and the following. As shown by the figures, different architectures can exist; however, they generally have similar components. For example, FIG. 2 illustrates an operational environment where a hypervisor, which may also be referred to in the art as a virtual machine monitor, is split into a microkernel 202 and a parent partition 204 whereas FIG. 3 illustrates hypervisor 304 as including elements found in the parent partition 204 of FIG. 2.

Turning to FIG. 2, hypervisor microkernel 202 can be configured to control and arbitrate access to the hardware of computer system 200. Broadly, hypervisor microkernel 202 can generate execution environments called partitions such as child partition 1 through child partition N (where N is an integer greater than 1). In embodiments a child partition is the basic unit of isolation supported by hypervisor microkernel 202. That is, each child partition can be mapped to a set of hardware resources, e.g., memory, devices, logical processor cycles, etc., that is under control of the hypervisor microkernel 202 and hypervisor microkernel 202 can isolate processes in one partition from accessing another partition's resources, e.g., a guest operating system in one partition may be isolated from the memory of another partition and thus may not be able to detect memory addresses outside of it's partition. In embodiments hypervisor microkernel 202 can be a standalone software product, a part of an operating system, embedded within firmware of the motherboard, specialized integrated circuits, or a combination thereof.

In the depicted example, parent partition component 204, which can also be also thought of as similar to domain 0 of Xen's open source hypervisor. Parent partition 204 in this operational environment can be configured to provide resources to guest operating systems executing in the child partitions 1-N by using virtualization service providers 228 (VSPs) that are typically referred to as back-end drivers in the open source community. Broadly, VSPs 228 can be used to multiplex the interfaces to the hardware resources by way of virtualization service clients (VSCs) (typically referred to as front-end drivers in the open source community) and communicate with the virtualization service clients via communication protocols. As shown by the figures, virtualization service clients can execute within the context of guest operating systems. These drivers are different than the rest of the drivers in the guest in that they may be supplied with a hypervisor, not with a guest.

Microkernel 202 can enforce partitioning by restricting a guest operating system's view of system memory. Guest memory is a partition's view of memory that is controlled by a hypervisor. The guest physical address can be backed by system physical address (SPA), i.e., the memory of the physical computer system, managed by hypervisor. As shown by the figure, in an embodiment the GPAs and SPAs can be arranged into memory blocks, i.e., one or more pages of memory. When a guest writes to a block using its page table the data is actually stored in a block with a different system address according to the system wide page table used by hypervisor.

As shown by the figure, in embodiments of the present disclosure IO emulators (234 and 236), e.g., virtualized IDE devices, virtualized video adaptors, virtualized NICs, etc., can be configured to run within their respective child partitions. Described in more detail below, by configuring the emulators to run within the child partitions the attack surface of the hypervisor is reduced as well as the computational overhead.

Each child partition can include one or more virtual processors (230 and 232) that guest operating systems (220 and 222) can manage and schedule threads to execute thereon. Generally, the virtual processors are executable instructions and associated state information that provide a representation of a physical processor with a specific architecture. For example, one virtual machine may have a virtual processor having characteristics of an Intel x86 processor, whereas another virtual processor may have the characteristics of a PowerPC processor. The virtual processors in this example can be mapped to logical processors of the computer system such that the instructions that effectuate the virtual processors will be backed by logical processors. Thus, in an embodiment including multiple logical processors, virtual processors can be simultaneously executed by logical processors while, for example, other logical processor execute hypervisor instructions. The combination of virtual processors and memory in a partition can be considered a virtual machine.

Guest operating systems can include any operating system such as, for example, operating systems from Microsoft®, Apple®, the open source community, etc. The guest operating systems can include user/kernel modes of operation and can have kernels that can include schedulers, memory managers, etc. Generally speaking, kernel mode can include an execution mode in a logical processor that grants access to at least privileged processor instructions. Each guest operating system can have associated file systems that can have applications stored thereon such as terminal servers, e-commerce servers, email servers, etc., and the guest operating systems themselves. The guest operating systems can schedule threads to execute on the virtual processors and instances of such applications can be effectuated.

Referring now to FIG. 3, it illustrates an alternative architecture to that described above in FIG. 2. FIG. 3 depicts similar components to those of FIG. 2; however in this example embodiment the hypervisor 304 can include the microkernel component and components from the parent partition 204 of FIG. 2 such as the virtualization service providers 228 and device drivers 224 while management operating system 302 may contain, for example, configuration utilities used to configure hypervisor 304. In this architecture hypervisor 304 can perform the same or similar functions as hypervisor microkernel 202 of FIG. 2; however, in this architecture hypervisor 304 can be configured to provide resources to guest operating systems executing in the child partitions. Hypervisor 304 of FIG. 3 can be a stand alone software product, a part of an operating system, embedded within firmware of the motherboard or a portion of hypervisor 304 can be effectuated by specialized integrated circuits.

Figure 4:
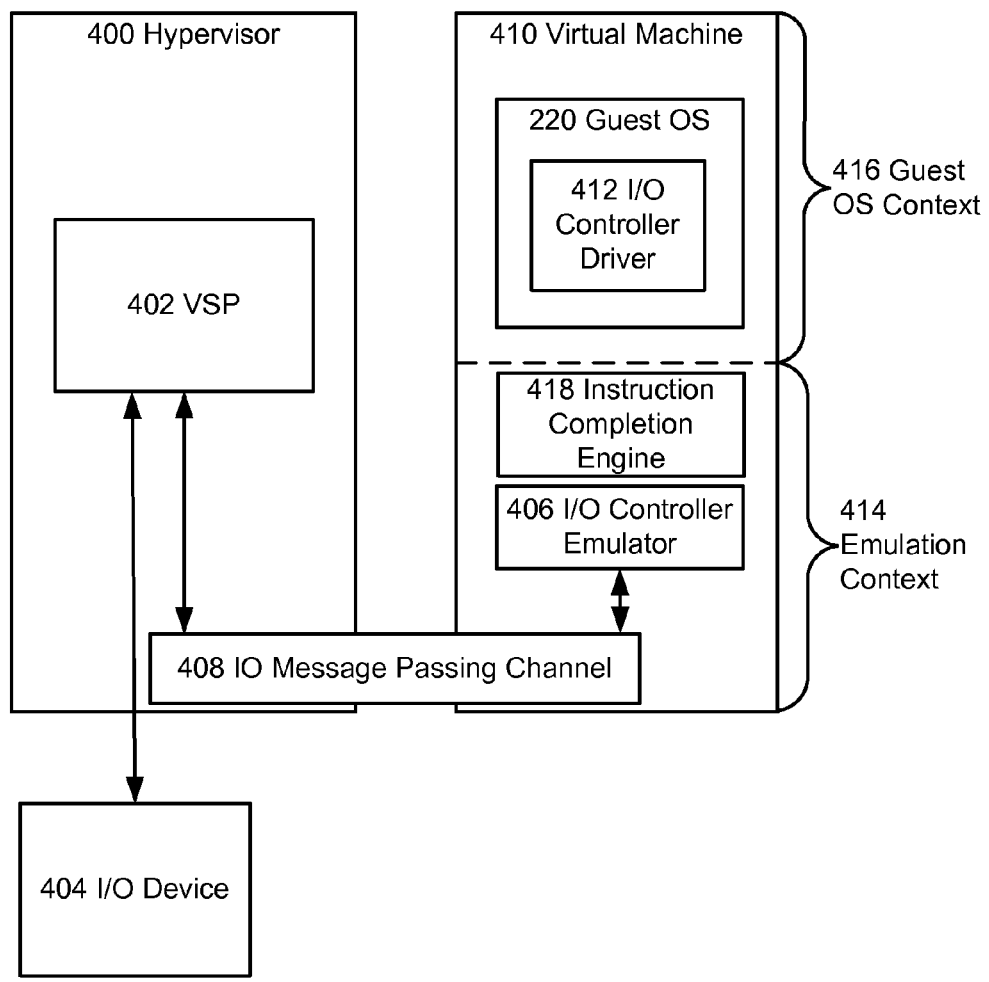
FIG. 4 illustrates an operational environment for describing aspects of the present disclosure.

Turning now to FIG. 4, it illustrates an example environment for practicing aspects of the present disclosure. As shown by the figure, IO controller emulator 406 can be injected into virtual machine 410, i.e., configured to run from guest physical memory allocated to virtual machine 410. When IO controller emulator 406 is executed by a virtual processor the instructions indicative of the emulator can configure the virtual processor to emulate a hardware IO controller.

IO controller emulator 406 can be attached to a plurality of registers and memory mapped IO space such that access to these resources is trapped and redirected to IO controller emulator 406. For example, a register, e.g. a port, can be used identify whether an IDE emulator is the primary or secondary IDE channel, to mask interrupts, to start a transaction, etc. In embodiments of the present disclosure hypervisor 400 can set traps on these ports and if driver 412 attempts to write to what acts like a hardware port, hypervisor 400 can trap on the register access, e.g., intercept the register access, stop the virtual processor running driver 412, and pass what was written to the register to IO controller emulator 406. The IO controller emulator 406 can then be executed and take an action. For example, the IO controller emulator 406 can send a request to VSP 402 to fetch a block of data, it could move data into guest physical memory, return some information it has, etc. One skilled in the art can appreciate that multiple IO emulators could be mapped to memory in virtual machine 410 or a combination of emulators in hypervisor 400 or virtual machine 410 can exist. Moreover, one skilled in the art can appreciate that some IO resources, e.g., registers and IO memory, could have hypervisor traps set on them while other IO resources may not.

Continuing with the description of FIG. 4, IO controller emulator 406 can interact with hypervisor 400 via an IO message passing channel 408. Hypervisor 400 can include a virtualization service provider 402 that can multiplex the interface to an IO device 404 such as a disk. The IO message passing channel 408 can, for example include memory mapped to both hypervisor 400 and virtual machine 410. Within the shared memory a ring buffer can be effectuated that allows messages and data to be passed between VSP 402 and IO controller emulator 406. In an example storage embodiment, IO controller emulator 406 can communicate with VSP 402 using a high level communication protocol like SCSI. By using a high level protocol the amount of requests needed to perform a real IO job can be significantly reduced. For example, hundreds of actions across hardware used to generate an IO request to fetch a block from disk could be expressed by a single command by a communication protocol used by IO message passing channel 408. In an example embodiment IO message passing channel 408 is a logical channel which enables partition to partition (or hypervisor) communication. In an embodiment of the present disclosure the IO message passing channel can include similar features to those described in U.S. patent application Ser. No. 11/128,647 entitled "Partition Bus," the contents of which is herein incorporated by reference in its entirety.

In a specific example embodiment virtualization service provider 402 can be a storage service configured to communicate with physical storage devices such as logical unit numbers (LUNs) provided by SANs, e.g., disks that may already be virtualized by other storage virtualization techniques, on behalf of child partitions. In one instance virtualization service provider 402 can receive I/O requests from virtual machines and route them to LUNs. In another instance, where LUNs are sub-allocated, virtualization service provider 402 can be configured to generate virtual hard drives; expose them to virtual machines; and store them as virtual hard drive (VHD) files on LUNs or on physical drives. A VHD file represents a virtual machine hard disk that can be encapsulated within a single file. Virtualization service provider 402 can parse the file and effectuate a disk that can be exposed to guest operating system 220 as if it were physical storage. The virtual hard disks generated by virtualization service provider 402 can be represented to a bus that is accessible to the guest operating systems in a way that appears like they are local. In addition to the foregoing, virtualization service provider 402 can be a network adapter service acting as an arbiter for network access, a graphics adapter service acting as an arbiter for video card access requests.

As shown by the figure, in an example embodiment another mode of operation can be given to a virtual processor running in virtual machine 410. For example, when a virtual processor is running guest code, e.g., guest operating system 220 or an IO controller driver 412, it is running in guest context 416 and is, for example, using guest operating system's page table. In embodiments of the present disclosure, emulation context 414 can be added to a virtual processor to run IO controller emulator 406. Virtual processor in emulator mode 414 can include an additional per-virtual processor state block, page table, and a specialized set of operations the virtual processor can execute. For example, virtual processor in this emulation context 414 may only be able to execute the hypercall, e.g., a request sent to hypervisor 400, to exit the mode. If for example, a malicious user attacks IO controller emulator 406 virtual machine 410 may simply not work, e.g., the malicious user ends up crashing his or her virtual machine. In another embodiment, if hypervisor 400 detects that IO controller 406 has been tampered with hypervisor 400 can take action in accordance with a policy. For example, if an illegal operation is detected, hypervisor 400 could shut it down, let it run, stop it until an administrator authorizes further execution, reset it, etc.

The following are a series of flowcharts depicting operational procedures. For ease of understanding, the flowcharts are organized such that the initial flowcharts present implementations via an overall "big picture" viewpoint and subsequent flowcharts provide further additions and/or details. Furthermore, one of skill in the art can appreciate that the operational procedure depicted by dashed lines are considered optional.

Figure 5:
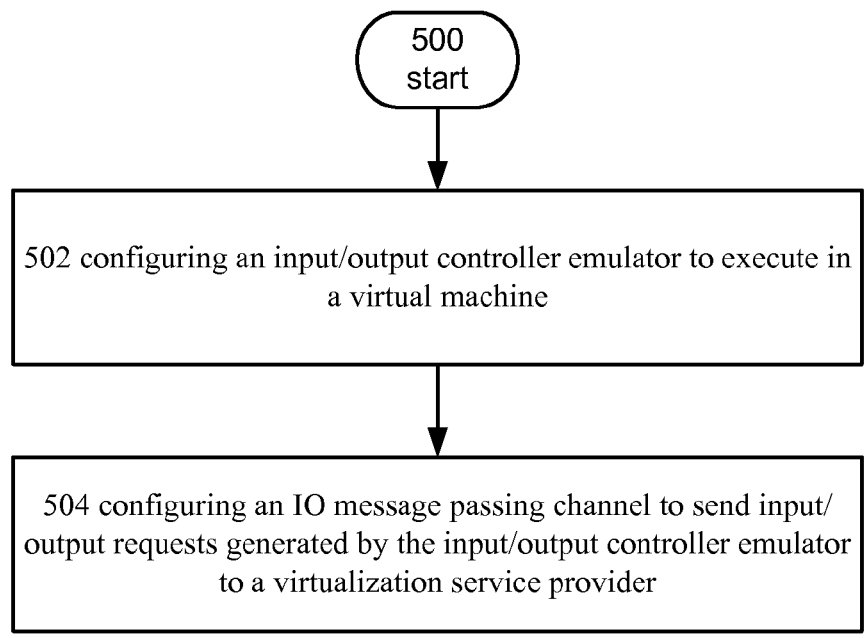
FIG. 5 depicts operational procedure for practicing aspects of the present disclosure.

Referring now to FIG. 5, it illustrates an operational procedure for practicing aspects of the present disclosure. As shown by the figure, operation 500 begins the operational procedure and operation 502 shows configuring an input/output controller emulator to execute in a virtual machine. For example, and turning to FIG. 4, in an embodiment of the present disclosure instructions indicative of IO controller emulator 406 can be stored in guest physical addresses associated with virtual machine 410. A virtual processor such as virtual processor 230 can be configured to execute the emulator instructions when IO controller driver attempts to perform an IO operation, e.g., it touches memory mapped to the emulator or registers associated with IO emulator 406.

In an example embodiment instructions indicative of IO emulator 406 can be stored in guest physical addresses and guest operating system 220 can be configured to ignore the addresses. For example, prior to booting guest operating system 220 firmware can be executed that loads IO emulator 406 into virtual machine's memory addresses and marks the memory as reserved. By marking the memory as reserved guest operating system 220, when loaded, will not use the memory thereby overwriting the IO emulator 406.

IO emulator 406 can be configured to execute when IO driver 412 attempts to access an IO port associated with the device the emulator is emulating or IO mapped memory. For example, hypervisor 400 can be configured to mark the IO ports and memory with hypervisor intercepts and if IO driver 412 touches the resources hypervisor 400 can intercept access and execute. Hypervisor 400 can check a table that identifies ports that cause entry into emulation context 414; save the state of the virtual processor; switch to emulation context 414; and pass the information the IO controller driver 412 attempted to write to resources assigned to IO controller emulator 406. The information passed to IO controller emulator 406 can cause various results. For example, not all traps will result in a message being sent through the IO channel. Instead, certain requests can be handled within the emulator and would not need to be sent to virtualization service provider 402.

Continuing with the description of FIG. 5, operation 504 shows configuring an IO message passing channel to send input/output requests generated by the input/output controller emulator to a virtualization service provider. Continuing with the example from above, prior to booting guest operating system 220 firmware can be executed that loads a copy of IO message passing channel 408 into memory and marks the memory as reserved. IO message passing channel 408 can have a protocol set for each type of IO emulator running in virtual machine 410, e.g., a networking stack, a storage stack, a serial port stack, a video stack, a mouse stack, etc., and use these stacks to generate messages that can be passed to virtualization service providers that control the hardware of the computer system.

Figure 6:
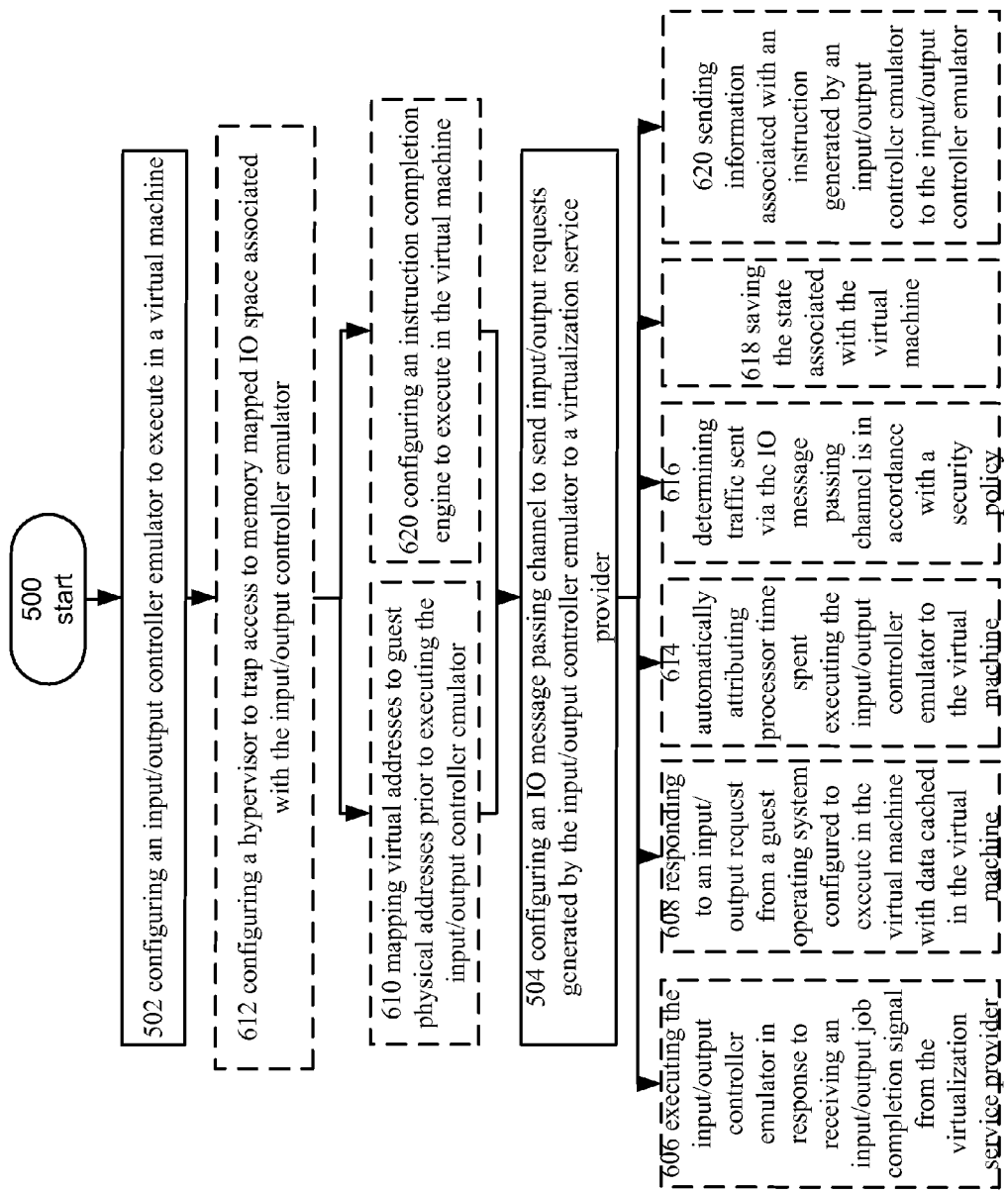
FIG. 6 depicts an alternative embodiment of the operational procedure of FIG. 5.

Turning now to FIG. 6, it illustrates an alternative embodiment of the operational procedure of FIG. 5 including operations 606-624. Turning to operation 606 it illustrates executing the input/output controller emulator in response to receiving an input/output job completion signal from the virtualization service provider. For example, in an embodiment of the present disclosure, input/output controller emulator 406 can be asynchronously executed. That is, input/output controller emulator 406 can be run by a virtual processor when something happens outside of virtual machine 410. For example, IO controller emulator 406 can be executed in response to receiving a signal from virtualization service provider 402. In response to receiving the signal hypervisor 400 can switch to emulation context 414 and process the signal.

In a specific example, IO controller driver 412 may issue an instruction to read data from a location on storage into guest physical addresses and configure IO controller emulator 406 to send a signal, e.g., an interrupt, to IO controller driver 412 when finished. When the job is completed and virtualization service provider 402 sends a completion signal to IO controller emulator 406, hypervisor 400 can receive the signal and switch a virtual processor into emulation context 414 and run input/output controller emulator 406. Input/output controller emulator 406 can then processes the data fetched by virtualization service provider 402 and insert it into guest physical memory requested by IO controller driver 412. Input/output controller emulator 406 can then send an interrupt to guest operating system 220 so that the next time it executes guest operating system can process the interrupt and determine that the data has been written to memory. In a specific example, IO controller emulator 406 can be connected to an interrupt line. When IO controller emulator 406 runs it can set the virtual processor's state to reflect that an interrupt line is showing a pending interrupt. When virtual processor is switched to guest OS context 416 and runs guest operating system 220 the guest will detect the interrupt and service it by, for example, running IO controller driver 412.

Continuing with the description of FIG. 6, operation 608 shows responding to an input/output request from a guest operating system configured to execute in the virtual machine with data cached in the virtual machine. For example, in an embodiment of the present disclosure input/output controller emulator 406 can store data that it expects guest operating system 220 will request in reserved memory of virtual machine 410. In an example embodiment, guest operating system 220 can touch a register associated with IO controller emulator 406. This can cause a trap into hypervisor 400 which can context switch to emulation context 414. In the event that guest operating system 220 request the data it can be returned from memory controlled by input/output controller emulator 406 without having to send a request to virtualization service provider 402. In an example embodiment virtualization service provider 402 can determine how much data to send back using information that describes how much reserved memory is available in virtual machine 410 to buffer data, how many requests it is servicing from all the virtual machines on the physical computer, the priority associated with virtual machine 410, etc. In another example embodiment the data could be buffered elsewhere in memory that can be accessed by hypervisor 400. In the event that buffered data is requested the data can be sent to the emulator or the pages containing the memory can be remapped so that input/output controller emulator 406 can access the system physical addresses containing the data.

In a specific example where IO controller driver 406 is a storage emulator, when IO controller driver 406 sends a request for "block 78" storage virtualization service provider 402 can determine to read twenty blocks or the entire track that contains block 78 and send the data to input/output controller emulator 406. IO controller emulator 406 can be configured to check the buffer when it receives a request to read data prior to sending another request to virtualization service provider 402.

Turning to operation 610 it shows mapping virtual addresses to guest physical addresses prior to executing the input/output controller emulator. For example, in an embodiment of the present disclosure when the virtual processor enters emulation context 414 the page table used by guest operating system 220 can be stored in memory and a page table that maps guest virtual addresses to guest physical addresses can be loaded. In this mode of operation the virtual processor (emulating a hardware device that operates on physical addresses) can be configured to run in a mode where virtual addresses for memory always equal physical addresses. That is, in this mode paging can be turned on, but the page table maps to the physical addresses in a 1 to 1 manner. This allows for the emulation of a direct memory address operation. In the same, or another example embodiment the page table used by guest operating system 220 can be made available to input/output controller emulator 406 so that instructions issued in guest virtual addresses can be translated into guest physical addresses.

Continuing with the description of FIG. 6, operation 612 shows configuring a hypervisor to trap access to memory mapped IO space associated with the input/output controller emulator. For example, in an embodiment of the present disclosure hypervisor 400 can be configured to intercept access to memory reserved for IO controller emulator 406. In this example embodiment when guest operating system 220 touches this memory hypervisor 400 can intercept the access and switch to emulation context 414; pass the value guest operating system 220 attempted to write to memory; and execute IO controller emulator 406

Operation 614 shows automatically attributing processor time spent executing the input/output controller emulator to the virtual machine. For example, in an embodiment of the present disclosure the amount of time a virtual processor spends running an input/output controller emulator 406 can be recorded and accounted to virtual machine 410. Typically the only accounting mechanism in a virtual machine environment that can be recorded is that the amount of time a virtual processor runs in a virtual machine. In this embodiment since the input/output controller emulator 406 is running in virtual machine 410 the time it spends running is naturally attributed to the child partition and allows for accurate accounting records to be generated.

In an architecture where IO controllers are run in a management partition or a hypervisor it is difficult to determine how much processor time the virtual machine actually uses because each process in the virtualization architecture is not necessarily capable of recording the amount of time it runs for different virtual machines. In order to get an accurate idea of how much processor time is being used by a virtual machine each processes used to effectuate a virtual machine would have to be reengineered to account time spent working on specific virtual machine requests.

Operation 616 shows determining traffic sent via the IO message passing channel is in accordance with a security policy. For example, a process can execute to monitor the traffic moving across the inter-partition communication bus to determine whether the traffic is in violation of the security policy. For example, hypervisor 400 can include a security program that is similar to a network security program that can monitor the traffic moving across the bus. If the traffic is in violation of the security policy hypervisor 400 can be configured to shut the virtual machine down.

Turning now to operation 618 it shows saving the state associated with the virtual machine. For example, in an embodiment of the present disclosure the state of the virtual machine, which can include the state of IO controller emulator 406, can be saved. For example, the state of a virtual machine can include file-based snapshots of the state, disk data, and configuration of a virtual machine at a specific point in time. Later, users can instantiate the virtual machine to that state. When input/output emulator 406 is executed within the context of a virtual machine, i.e., is running in guest physical addresses, a snapshot operation naturally obtains the state of input/output emulator 406 and allows for a user to save/restore it without having to obtain data stored in memory of the management partition or hypervisor.

Turning now to operation 620 it shows configuring an instruction completion engine to execute in the virtual machine. For example, in an embodiment of the present disclosure instruction completion engine 418 can execute within virtual machine 410. For example, in an embodiment instruction completion engine 418 can configure the state associated with guest OS context 416 and/or guest physical memory to reflect that an operation has been completed by input/output emulator 406. For example, when IO driver 412 writes an instruction to IO controller emulator 406 execution stops and the emulator is run. In addition to running the emulator, the effects of issuing the instruction on the virtual processor in guest OS context 416 also need to be emulated. In a specific example input/output emulator 406 can execute and obtain some data. Instruction completion engine 418 can execute and determine the type of operation that the emulator performed and determine that the data needs to be moved from the input/output emulator 406 to the EAX register on virtual processor as it is in guest OS context 416. In this example instruction completion engine 418 can manipulate the state information used to configure virtual processor when it enters guest OS context 416 so that when virtual processor runs it has the data in the EAX register and the instruction pointed has been advanced to the next instruction.

Turning now to operation 622 it shows sending information associated with an instruction generated by an input/output controller emulator to the input/output controller emulator. For example, in an embodiment of the present disclosure hypervisor 400 can execute when an intercept occurs. In this example embodiment hypervisor 400 can be configured to analyze the instruction to determine how to handle it. In doing so hypervisor 400 may be able to obtain information that would be useful to the IO controller emulator 406 such as where the intercept occurred, how large the instruction is that was intercepted, what type of operation it is, the operands, etc. Hypervisor can store this information in a record and place it in memory associated with IO controller emulator 406. When IO controller emulator 406 runs it can detect the record and the additional information could potentially speed up execution of the IO controller emulator 406.

Figure 7:
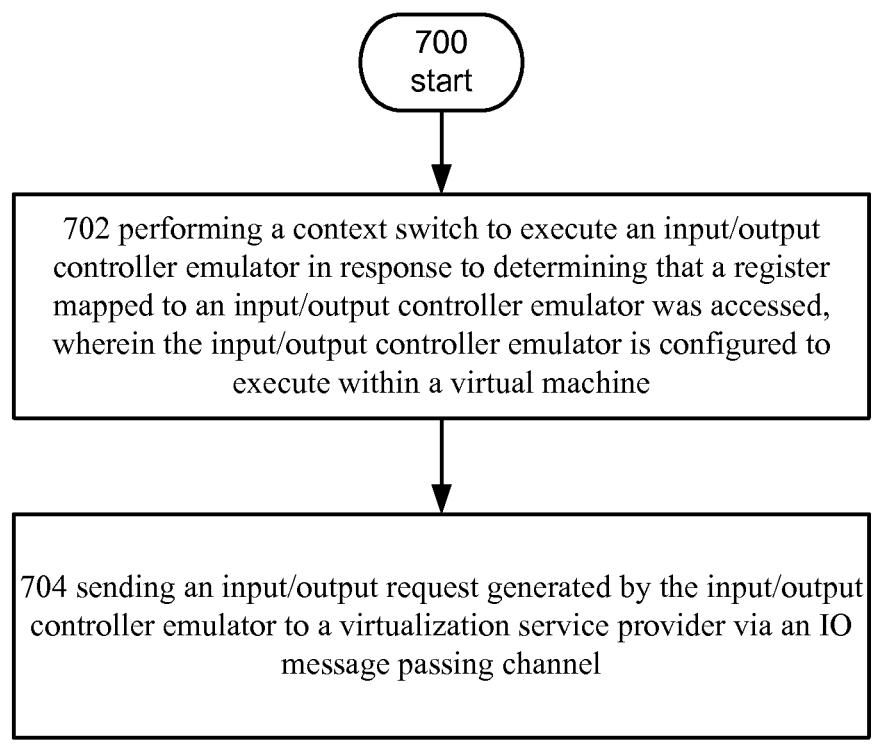
FIG. 7 depicts operational procedure for practicing aspects of the present disclosure.

FIG. 7 illustrates an operational procedure for practicing aspects of the present disclosure including operations 700, 702, and 704. Operation 700 begins the operational procedure and operation 702 shows performing a context switch to execute an input/output controller emulator in response to determining that a register mapped to an input/output controller emulator was accessed, wherein the input/output controller emulator is configured to execute within a virtual machine. For example, and turning to FIG. 4, a virtual processor can context switch to emulation context 414 to run input/output controller emulator 406 that is stored in guest physical addresses allocated to virtual machine 410 in response to guest operating system 220 touching a register of IO controller emulator 406. In an example embodiment when a switch occurs hypervisor 400 can save the processor state, e.g., the contents of the various registers on a processor, associated with the virtual processor in guest OS context 416 to memory and change the page table. For example, in an embodiment of the present disclosure hypervisor 400 may switch from running the virtual processor in guest OS context 416 to emulation context 414 in response to receiving a signal indicating that IO controller driver 516 touched a resource allocated to IO controller emulator 406, e.g., memory mapped IO or one or more IO ports of the emulator.

Continuing with the description of FIG. 7, operation 704 shows sending an input/output request generated by the input/output controller emulator to a virtualization service provider via an IO message passing channel. For example, in an embodiment of the present disclosure the IO controller driver 412 may attempt to write to registers of IO controller emulator 402 and a virtual processor can execute IO controller emulator 406. IO controller emulator 406 can determine what type of IO operation driver 412 wants and can generate high level protocol request to send to virtualization service provider 402.

In a specific example IO controller emulator 406 can be emulating an IDE controller. In this example IO driver 412 may want to write data to disk and can attempt to send various signals to ports associated with IO controller emulator 406. Hypervisor 400 can trap access to the ports and context switch to run IO controller emulator 406. The emulator can be executed and determine that IO driver 412 was attempting to write data to disk. IO controller emulator 406 can then generate a, for example, SCSI request indicative of a request to write the data to disk and store the request in IO message passing channel 408. Virtualization service provider 402, in this example handling storage, can access IO message passing channel 408 and obtain the SCSI request. Virtualization service provider 402 can then execute and send a request to IO device 504.

In another specific example embodiment IO controller emulator 406 could be a network card emulator. Similar to the preceding example, when hypervisor 400 detects that IO driver 412 attempts to touch a register to send one or more packets of information to a MAC address, emulator 406 can run and generate a high level request that can be sent to virtualization service provider 402 which in this example is handling networking.

Figure 8:
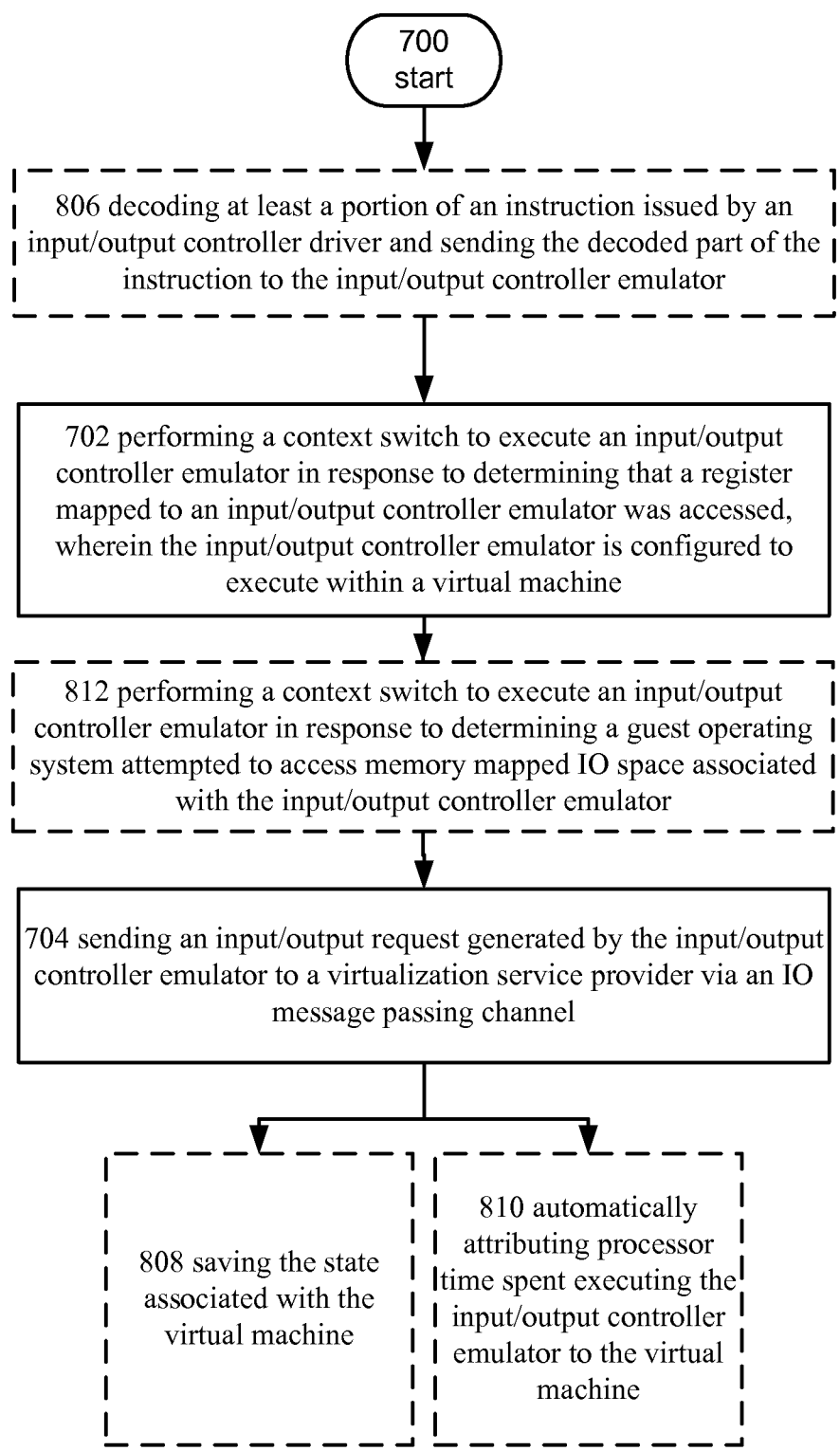
FIG. 8 depicts an alternative embodiment of the operational procedure of FIG. 7.

Turning now to FIG. 8, it illustrates an alternative embodiment of the operational procedure of FIG. 7 including operations 806-812. Operation 806 shows decoding at least a portion of an instruction issued by an input/output controller driver and sending the decoded part of the instruction to the input/output controller emulator. For example, in an embodiment of the present disclosure hypervisor 400 can execute when an intercept occurs. In this example embodiment hypervisor 400 can be configured to analyze the instruction to determine how to handle it. In doing so hypervisor 400 may be able to obtain information that would be useful to the IO controller emulator 406 such as where the intercept occurred, how large the instruction is that was intercepted, what type of operation it is, the operands, etc. Hypervisor can store this information in a record and place it in memory associated with IO controller emulator 406. When IO controller emulator 406 runs it can detect the record and the additional information could potentially speed up execution of the IO controller emulator 406.

Continuing with the description of FIG. 8, operation 808 shows saving the state associated with the virtual machine. For example, in an embodiment of the present disclosure the state of the virtual machine, which can include the state of IO controller emulator 406, can be saved. For example, the state of a virtual machine can include file-based snapshots of the state, disk data, and configuration of a virtual machine at a specific point in time. Later, users can instantiate the virtual machine to that state. When input/output emulator 406 is executed within the context of a virtual machine, i.e., is running in guest physical addresses, a snapshot operation naturally obtains the state of input/output emulator 406 and allows for a user to save/restore it without having to obtain data stored in memory of the management partition or hypervisor.

Continuing with the description of FIG. 8, operation 810 shows automatically attributing processor time spent executing the input/output controller emulator to the virtual machine. For example, in an embodiment of the present disclosure the amount of time a virtual processor spends running an input/output controller emulator 406 can be recorded and accounted to virtual machine 410. Typically the only accounting mechanism in a virtual machine environment that can be recorded is that the amount of time a virtual processor runs in a virtual machine. In this embodiment since the input/output controller emulator 406 is running in virtual machine 410 the time it spends running is naturally attributed to the child partition and allows for accurate accounting records to be generated.

Continuing with the description of FIG. 8, operation 812 shows performing a context switch to execute an input/output controller emulator in response to determining a guest operating system attempted to access memory mapped IO space associated with the input/output controller emulator. For example, in an embodiment of the present disclosure hypervisor 400 can be configured to intercept access to memory reserved for IO controller emulator 406. In this example embodiment when guest operating system 220 touches this memory hypervisor 400 can intercept the access and switch to emulation context 414; pass the value guest operating system 220 attempted to write to memory; and execute IO controller emulator 406.

Figure 9:
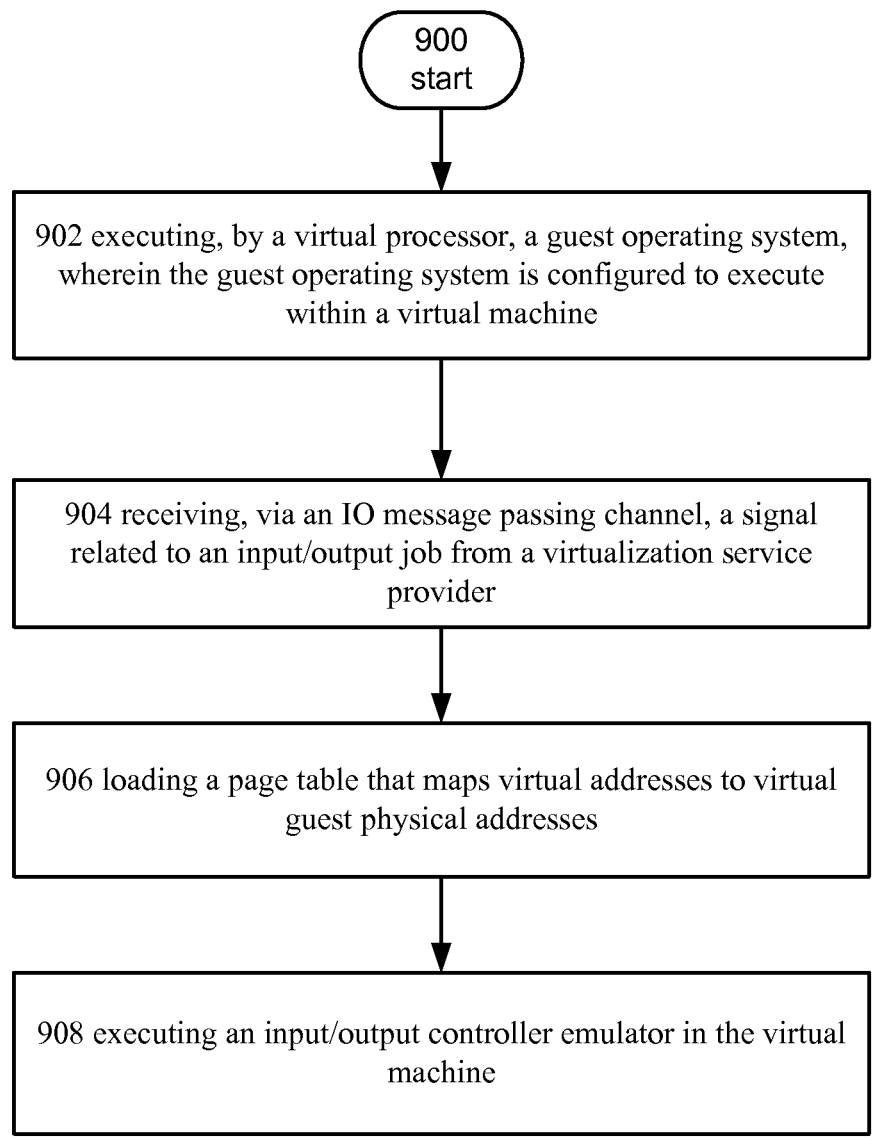
FIG. 9 depicts operational procedure for practicing aspects of the present disclosure.

Turning now to FIG. 9, it illustrates an operational procedure for practicing aspects of the present disclosure including operations 900, 902, 904, 906, and 1008. As shown by the figure, operation 900 begins the operational procedure and operation 1002 shows executing, by a virtual processor, a guest operating system, wherein the guest operating system is configured to execute within a virtual machine. For example, in an embodiment guest operating system 220 can be executed by a virtual processor in virtual machine 410. As described above, a virtual processor, e.g., a logical processor configured by state information, can run guest operating system 220 in guest OS context 416. In this example the guest operating system can be stored in RAM allocated to a guest partition and the virtual processor can be configured to access RAM allocated to the guest.

Continuing with the description of FIG. 9, operation 904 shows receiving, via an IO message passing channel, a signal related to an input/output job from a virtualization service provider. For example, in an embodiment an asynchronous event, e.g., a signal from virtualization service provider 402 can be received via IO message passing channel 408. For example, IO controller emulator 406 can be executed in response to receiving a signal from virtualization service provider 402. In response to receiving the signal hypervisor 400 can switch to emulation context 414 and process the signal.

Turning to operation 906, it shows loading a page table that maps virtual addresses to virtual guest physical addresses. For example, in an embodiment of the present disclosure when the virtual processor enters emulation context 414 the page table used by guest operating system 220 can be stored in memory and a page table that maps guest virtual addresses to guest physical addresses can be loaded. In this mode of operation the virtual processor (emulating a hardware device that operates on physical addresses) can be configured to run in a mode where virtual addresses for memory always equal physical addresses. That is, in this mode paging can be turned on, but the page table maps to the physical addresses in a 1 to 1 manner. This allows for the emulation of a direct memory address operation. In the same, or another example embodiment the page table used by guest operating system 220 can be made available to input/output controller emulator 406 so that instructions issued in guest virtual addresses can be translated into guest physical addresses.

Turning to operation 908, it shows executing an input/output controller emulator in the virtual machine. For example, and turning to FIG. 4, instructions indicative of IO controller emulator 406 can be stored in guest physical addresses associated with virtual machine 410 and executed by virtual processor running in emulation context 414. Continuing with the example above, when the job is completed and virtualization service provider 402 sends a completion signal to IO controller emulator 406, hypervisor 400 can receive the signal and switch a virtual processor into emulation context 414 and run input/output controller emulator 406. Input/output controller emulator 406 can then processes the data fetched by virtualization service provider 402 and insert it into guest physical memory requested by IO controller driver 412. Input/output controller emulator 406 can then send an interrupt to guest operating system 220 so that the next time it executes the guest operating system can process the interrupt and determine that the data has been written to memory. In this example IO controller emulator 406 can be connected to an interrupt line. When IO controller emulator 406 runs it can set the virtual processor's state to reflect that an interrupt line is showing a pending interrupt. When virtual processor is switched to guest OS context 416 and runs guest operating system 220 the guest will detect the interrupt and service it by, for example, running IO controller driver 412.

Figure 10:
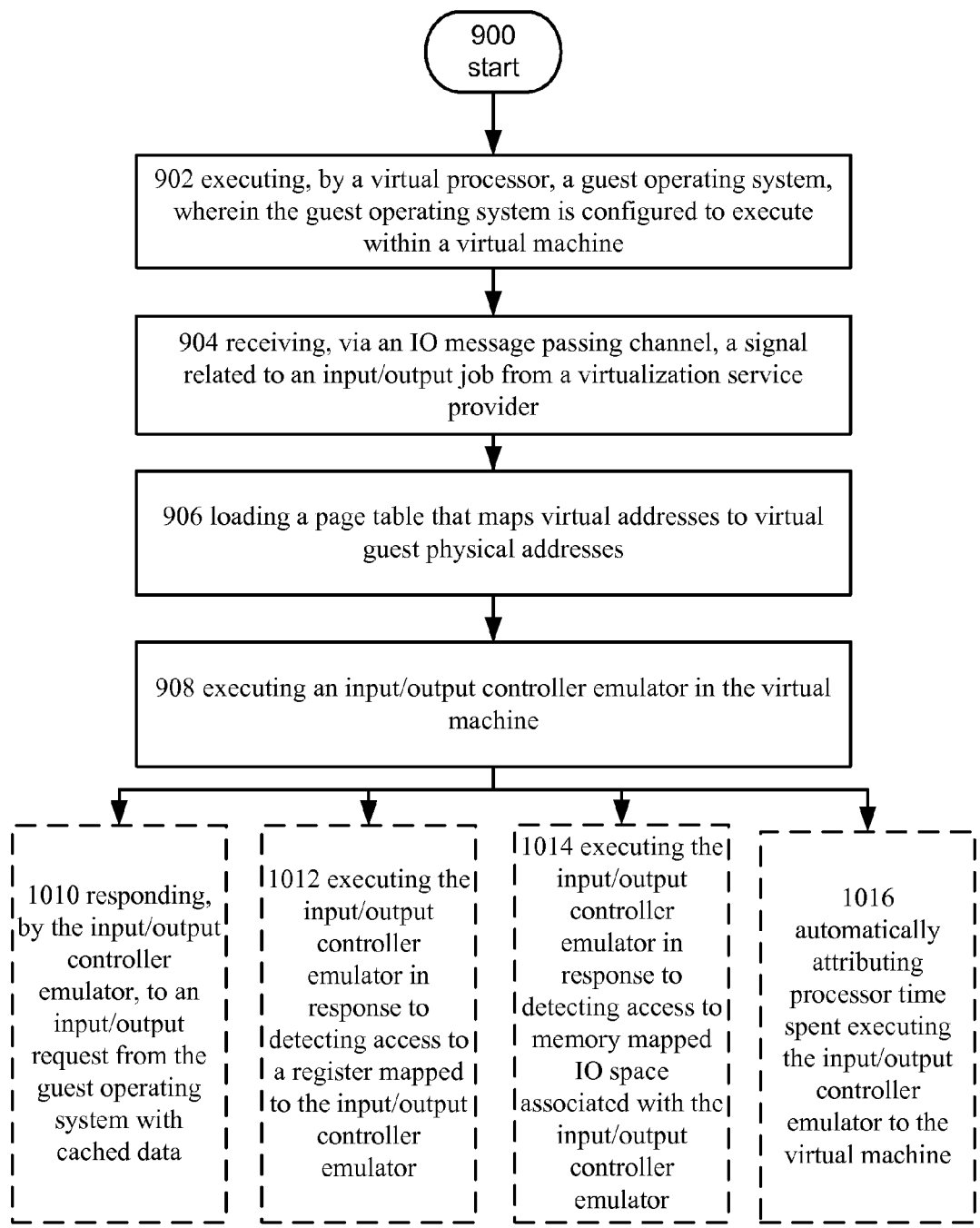
FIG. 10 depicts an alternative embodiment of the operational procedure of FIG. 9.

Turning now to FIG. 10, it illustrates an alternative embodiment of the operational procedure of FIG. 9 including operations 1010-1016. Operation 1010 shows responding, by the input/output controller emulator, to an input/output request from the guest operating system with cached data. For example, in an embodiment of the present disclosure input/output controller emulator 406 can store data that it expect guest operating system 220 will request in reserved memory of virtual machine 410. In the event that guest operating system 220 request the data it can be returned from memory controlled by input/output controller emulator 406 without having to send a request to the virtualization service provider 402. In an example embodiment virtualization service provider 402 can determine how much data to send back using information that describes how much reserved memory is available in virtual machine 410 to buffer data, how many requests it is servicing from all the virtual machines on the physical computer, the priority associated with the child partition, etc. In another example embodiment the data could be buffered elsewhere in memory that can be accessed by the hypervisor. In the event that buffered data is requested the data can be sent to the emulator or the pages containing the memory can be remapped so that the input/output controller emulator can access the system physical addresses containing the data.

Continuing with the description of FIG. 10, operation 1012 shows executing the input/output controller emulator in response to detecting access to a register mapped to the input/output controller emulator. For example, IO emulator 406 can be configured to execute when IO driver 412 attempts to access an IO port associated with the device the emulator is emulating or IO mapped memory. For example, hypervisor 400 can be configured to make the IO ports and memory with hypervisor intercepts and if IO driver 412 touches the resources hypervisor 400 can intercept access and execute. Hypervisor 400 can check a table that identifies ports that cause entry into emulation context 414; save the state of the virtual processor; switch to emulation context 414; and pass the information the IO controller driver 412 attempted to write to resources assigned to IO controller emulator 406.

Continuing with the description of FIG. 11, operation 1114 shows executing the input/output controller emulator in response to detecting access to memory mapped IO space associated with the input/output controller emulator. For example, in an embodiment of the present disclosure hypervisor 400 can be configured to intercept access to memory reserved for IO controller emulator 406. In this example embodiment when guest operating system 220 touches this memory hypervisor 400 can intercept the access and switch to emulation context 414; pass the value guest operating system 220 attempted to write to memory; and execute IO controller emulator 406.

Continuing with the description of FIG. 11, operation 1116 shows automatically attributing processor time spent executing the input/output controller emulator to the virtual machine. For example, in an embodiment of the present disclosure the amount of time a virtual processor spends running an input/output controller emulator 406 can be recorded and accounted to virtual machine 410. Typically the only accounting mechanism in a virtual machine environment that can be recorded is that the amount of time a virtual processor runs in a virtual machine. In this embodiment since the input/output controller emulator 406 is running in virtual machine 410 the time it spends running is naturally attributed to the child partition and allows for accurate accounting records to be generated.

The foregoing detailed description has set forth various embodiments of the systems and/or processes via examples and/or operational diagrams. Insofar as such block diagrams, and/or examples contain one or more functions and/or operations, it will be understood by those within the art that each function and/or operation within such block diagrams, or examples can be implemented, individually and/or collectively, by a wide range of hardware, software, firmware, or virtually any combination thereof.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

What is claimed is:

1. A computer system, comprising:
   circuitry for configuring an input/output controller emulator to execute in a virtual machine;
   circuitry for configuring an IO message passing channel to send input/output requests generated by the input/output controller emulator to a virtualization service provider;
   circuitry for performing a context switch to execute the input/output controller emulator in response to determining that a virtual register of the virtual machine mapped to an input/output controller emulator was accessed;
   circuitry for decoding, by a hypervisor, at least a portion of an issued instruction to determine where an intercept occurred, how large the instruction is, what type of operation is indicated by the operation, or an operand of the instruction, and sending the instruction and an indication of the decoded portion of the instruction to the input/output controller emulator;
   circuitry for generating an input/output request by the input/output controller emulator based on the instruction and the decoded portion of the instruction; and
   circuitry for sending an input/output request generated by the input/output controller emulator to the virtualization service provider via the IO message passing channel.

2. The computer system of claim 1, further comprising:
   circuitry for executing the input/output controller emulator in response to receiving an input/output job completion signal from the virtualization service provider.

3. The computer system of claim 1, further comprising:
   circuitry for responding to an input/output request from a guest operating system configured to execute in the virtual machine with data cached in the virtual machine.

4. The computer system of claim 1, further comprising:
   circuitry for mapping virtual addresses to guest physical addresses prior to executing the input/output controller emulator.

5. The computer system of claim 1, further comprising:
   circuitry for configuring the hypervisor to trap access to memory mapped IO space associated with the input/output controller emulator.

6. The computer system of claim 1, further comprising:
   circuitry for tracking an amount of physical processor time spent executing the virtual machine; and
   circuitry for automatically attributing physical processor time spent executing the input/output controller emulator to the virtual machine.

7. The computer system of claim 1, further comprising:
   circuitry for determining traffic sent via the IO message passing channel is in accordance with a security policy.

8. The computer system of claim 1, further comprising:
   circuitry for saving the state associated with the virtual machine.

9. The computer system of claim 1, further comprising:
   circuitry for configuring an instruction completion engine to execute in the virtual machine.

10. The computer system of claim 1, further comprising:
    circuitry for sending information associated with an instruction generated by an input/output controller emulator to the input/output controller emulator.

11. A computer readable storage device, excluding signals, including executable instructions, comprising:
    instructions for performing a context switch to execute an input/output controller emulator in response to determining that a register of a virtual machine mapped to the input/output controller emulator was accessed, the input/output controller emulator being configured to execute within the virtual machine;
    instructions for decoding, by a hypervisor, at least a portion of an issued instruction to determine where an intercept occurred, how large the instruction is, what type of operation is indicated by the operation, or an operand of the instruction;
    instructions for sending, by the virtual machine, the instruction and an indication of the decoded portion of the instruction to the input/output controller emulator, the input/output control emulator using the indication of the decoded portion of the instruction to process the instruction; and instructions for sending an input/output request generated by the input/output controller emulator to a virtualization service provider via an IO message passing channel.

12. The computer readable storage device of claim 11, further comprising:

instructions for saving the state associated with the virtual machine.

13. The computer readable storage device of claim 11, further comprising:

instructions for automatically attributing processor time spent executing the input/output controller emulator to the virtual machine.

14. The computer readable storage device of claim 11, further comprising:

instructions for performing a context switch to execute an input/output controller emulator in response to determining a guest operating system attempted to access memory mapped IO space associated with the input/output controller emulator.

15. A computer-implemented method, comprising:

configuring an input/output controller emulator to execute in a virtual machine;

configuring an IO message passing channel to send input/output requests generated by the input/output controller emulator to a virtualization service provider;

performing a context switch to execute the input/output controller emulator in response to determining that a virtual register of the virtual machine mapped to an input/output controller emulator was accessed;

decoding, by a hypervisor, at least a portion of an issued instruction to determine where an intercept occurred, how large the instruction is, what type of operation is indicated by the operation, or an operand of the instruction, and sending the instruction and an indication of the decoded portion of the instruction to the input/output controller emulator;

generating an input/output request by the input/output controller emulator based on the instruction and the decoded portion of the instruction; and sending an input/output request generated by the input/output controller emulator to the virtualization service provider via the IO message passing channel.

16. The computer-implemented method of claim 15, further comprising:

executing the input/output controller emulator in response to receiving an input/output job completion signal from the virtualization service provider.

17. The computer-implemented method of claim 15, further comprising:

responding to an input/output request from a guest operating system configured to execute in the virtual machine with data cached in the virtual machine.

18. The computer-implemented method of claim 15, further comprising:

mapping virtual addresses to guest physical addresses prior to executing the input/output controller emulator.

19. The computer-implemented method of claim 15, further comprising:

configuring the hypervisor to trap access to memory mapped IO space associated with the input/output controller emulator.

20. The computer-implemented method of claim 15, further comprising:

tracking an amount of physical processor time spent executing the virtual machine; and automatically attributing physical processor time spent executing the input/output controller emulator to the virtual machine.

* * * * *